(12) United States Patent
Ang et al.

(10) Patent No.: US 7,729,082 B2
(45) Date of Patent: Jun. 1, 2010

(54) APPLICATION OF PFPES FOR HDD SCREW LUBRICANT

(75) Inventors: Kor Seng Ang, Singapore (SG); Shaoyong Liu, Singapore (SG); Sivalingam Marimuthu, Singapore (SG); Jing Fang Pan, Singapore (SG); Yi Zhao Yao, Singapore (SG)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 980 days.

(21) Appl. No.: 11/459,864

(22) Filed: Jul. 25, 2006

(65) Prior Publication Data

US 2008/0024909 A1  Jan. 31, 2008

(51) Int. Cl.
G11B 17/22 (2006.01)
(52) U.S. Cl. .................................................. 360/97.01
(58) Field of Classification Search ............. 360/97.01, 360/97.02, 97.03, 97.04, 98.01
See application file for complete search history.

(56) References Cited

U.S. PATENT DOCUMENTS

| | | | |
|---|---|---|---|
| 3,914,178 A | 10/1975 | Fineran et al. | |
| 4,268,556 A | 5/1981 | Pedrotty | |
| 4,477,520 A | 10/1984 | Hamada et al. | |
| 4,529,659 A | 7/1985 | Hoshino et al. | |
| 4,692,988 A | 9/1987 | Shulver et al. | |
| 4,992,899 A | 2/1991 | Kaczeus et al. | |
| 5,200,867 A | 4/1993 | Albrecht et al. | |
| 5,218,496 A | 6/1993 | Kaczeus | |
| 6,007,286 A | 12/1999 | Toyota et al. | |
| 6,361,870 B1 | 3/2002 | Steffl et al. | |
| 6,408,489 B1 | 6/2002 | Cluggish | |
| 6,504,674 B2 | 1/2003 | Yoshida et al. | |
| 6,519,115 B1 | 2/2003 | Yaeger | |
| 6,854,351 B2 * | 2/2005 | Yabe et al. | 74/424.82 |
| 7,188,542 B2 * | 3/2007 | Yabe et al. | 74/424.82 |
| 7,253,994 B2 * | 8/2007 | Kagami et al. | 360/324.1 |
| 2002/0071959 A1 | 6/2002 | Yamaguchi et al. | |
| 2003/0104158 A1 | 6/2003 | Gui et al. | |
| 2003/0138172 A1 * | 7/2003 | Yabe et al. | 384/45 |
| 2004/0150921 A1 * | 8/2004 | Kagami et al. | 360/324.1 |
| 2005/0094320 A1 * | 5/2005 | Sano | 360/319 |
| 2005/0145175 A1 | 7/2005 | Ma et al. | |
| 2005/0166695 A1 * | 8/2005 | Yabe et al. | 74/424.88 |

FOREIGN PATENT DOCUMENTS

| | | |
|---|---|---|
| EP | 0357023 A2 | 3/1990 |
| EP | 1455101 A1 | 10/2004 |

* cited by examiner

*Primary Examiner*—Allen T Cao
(74) *Attorney, Agent, or Firm*—Patterson & Sheridan, L.L.P.

(57) ABSTRACT

The present invention relates to HDD screws, and more specifically to lubricating the HDD screws. HDD screws may be coated in a layer of a PFPE based lubricant to reduce friction while fastening the screw into a HDD. In addition to providing superior lubricity and reduced friction during fastening and longer shelf life, PFPE lubricated screws provide narrower clamping load distribution and lower particle generation compared to currently used screw lubricants. Furthermore, because PFPE lubricants are also used to lubricate magnetic disk surfaces, the HDD screws may provide a reservoir for replenishing depleting lubricants on the magnetic disk drive surface.

17 Claims, 4 Drawing Sheets

| SCREW S/N | CALMP LOAD | | |
|---|---|---|---|
| | UNLUBED | P104 LUBED | Z-DOL LUBED |
| 1 | 0.81 | 0.97 | 0.91 |
| 2 | 0.69 | 1.07 | 0.92 |
| 3 | 0.50 | 1.03 | 0.91 |
| 4 | 0.72 | 1.06 | 0.95 |
| 5 | 0.63 | 1.08 | 0.98 |
| 6 | 0.56 | 1.01 | 0.93 |
| 7 | 0.57 | 1.03 | 0.92 |
| 8 | 0.51 | 1.08 | 0.94 |
| 9 | 0.43 | 1.02 | 0.95 |
| 10 | 0.55 | 1.09 | 0.93 |
| AVE | 0.60 | 1.04 | 0.93 |
| STDEV | 0.115 | 0.038 | 0.022 |
| MAX | 0.81 | 1.09 | 0.98 |
| MIN | 0.43 | 0.97 | 0.91 |

501

APPLICATION OF PFPES FOR HDD SCREW LUBRICANT

BACKGROUND OF THE INVENTION

1. Field of the Invention

Embodiments of the present invention generally relate to screws used to secure components in a hard disk drive, and more specifically to lubricating the screws.

2. Description of the Related Art

Nearly every kind of computer today, be it a desktop computer, server, mainframe or supercomputer contains at least one hard disk drive (HDD). In fact, even some modern electronic devices such as camcorders and VCR's incorporate hard disk drives. The advantage of including hard disk drives is that they can store large amounts of information including the programs and data required to operate and use computers and electronic devices.

A hard disk drive comprises several mechanical components such as magnetic disks, actuator arms and electromagnetic heads to read/write data. A magnetic disk may contain concentric data tracks containing the data stored on the disks. The actuator arm may be coupled with an electromagnetic head. The electromagnetic head may be placed on a track of an associated disk to perform read and write operations. In addition to the disks and actuator arms, a hard disk drive may also contain motors for rotating the magnetic disks and moving the actuator arms to place a head at a particular location on a disk.

The components of a hard disk drive may be secured in a chassis using a combination of clamps and screws. However, installing screws may be difficult because of the high friction between the screw threads and mating parts in a bore during fastening. Due to the high friction, different screws may be fastened differently causing different clamping loads on the screws. Therefore, mechanical components may not be properly aligned. Additionally, due to the variations in clamping loads the components may be susceptible to shifting and misalignment upon the application of even minor shock to the hard disk drive. Furthermore, the screw fastening process may generate metallic particles that may deposit on sensitive portions of magnetic disks, thereby affecting the performance of the disks.

Screws used to secure components of a hard disk drive may be coated with a lubricant to lower the friction during screw fastening. For example, currently, P104 a surfactant available under the trademark PLURONIC from BASF corporation, a difunctional block copolymer surfactant terminating in primary hydroxyl groups, is used to coat screws used in HDD's. Screws coated with P104 offer several advantages over non-lubricated screws such as higher clamping load with narrower force variation and less metallic particle generation during fastening.

However, using P104 as a lubricant has several disadvantages. For instance, P104 has a relatively low melting temperature of around 32° C. Therefore, P104 may change phase to a liquid even at room temperature. Liquid P104 may migrate to other parts of the HDD such as the magnetic disk surface, thereby contaminating the surface. P104 also has a relatively low decomposition temperature of around 150° C. with a ramping rate of 20° C./min from room temperature. Decomposition of P104 may generate acids which may further damage the magnetic disks. The low decomposition temperature of P104 also results in a low shelf life of only about 2 years.

Furthermore, P104 has rather high water solubility. Therefore, P104 materials deposited on screws and elsewhere in the HDD may soak up moisture and cause disk drive components to rust over time.

Therefore, what is needed are better methods and materials for lubricating HDD screws.

SUMMARY OF THE INVENTION

The present invention generally relates to lubricating screws used to fasten components of a hard disk drive.

One embodiment of the invention provides a method for coating a screw with a lubricant. The method generally comprises mixing a predetermined amount of perfluoropolyether (PFPE) lubricant with a solvent to form a mixture, dipping the screw in the mixture, and removing the screw from the mixture and evaporating at least some of the solvent.

Another embodiment of the invention provides a hard disk drive. The hard disk drive generally comprises components including one or more magnetic disks, a first motor configured to spin the one or more magnetic disks, an actuator arm associated with each magnetic disk, each actuator arm comprising at least one electromagnetic head, wherein the head is configured to perform read and write operations along a concentric data track of the magnetic disk, and a second motor configured to move the actuator arm to place the electromagnetic head on the data track. The hard disk drive also comprises screws that fasten one or more of the components to each other or to a chassis of the hard disk drive, wherein the screws are coated with a PFPE lubricant.

Yet another embodiment of the invention provides a screw comprising a coating of PFPE lubricant. The coating of PFPE lubricant may be generally configured to reduce friction during fastening of the screw, reduce particle generation during fastening of the screw, and improve consistency in the clamp load between the screw and a second screw, wherein the second screw is similar to the first screw.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention relates to HDD screws, and more specifically to lubricating the HDD screws. HDD screws may be coated in a layer of a perfluoropolyether (PFPE) based lubricant to reduce friction while fastening the screw into a HDD. In addition to providing superior lubricity and reduced friction during fastening and longer shelf life, PFPE lubricated screws provide narrower clamping load distribution and lower particle generation compared to currently used screw lubricants. Furthermore, because PFPE lubricants are also used to lubricate magnetic disk surfaces, the HDD screws may provide a reservoir to replenish depleting lubricants on the magnetic disk drive surface.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Exemplary Hard Disk Drive

Figure 1:
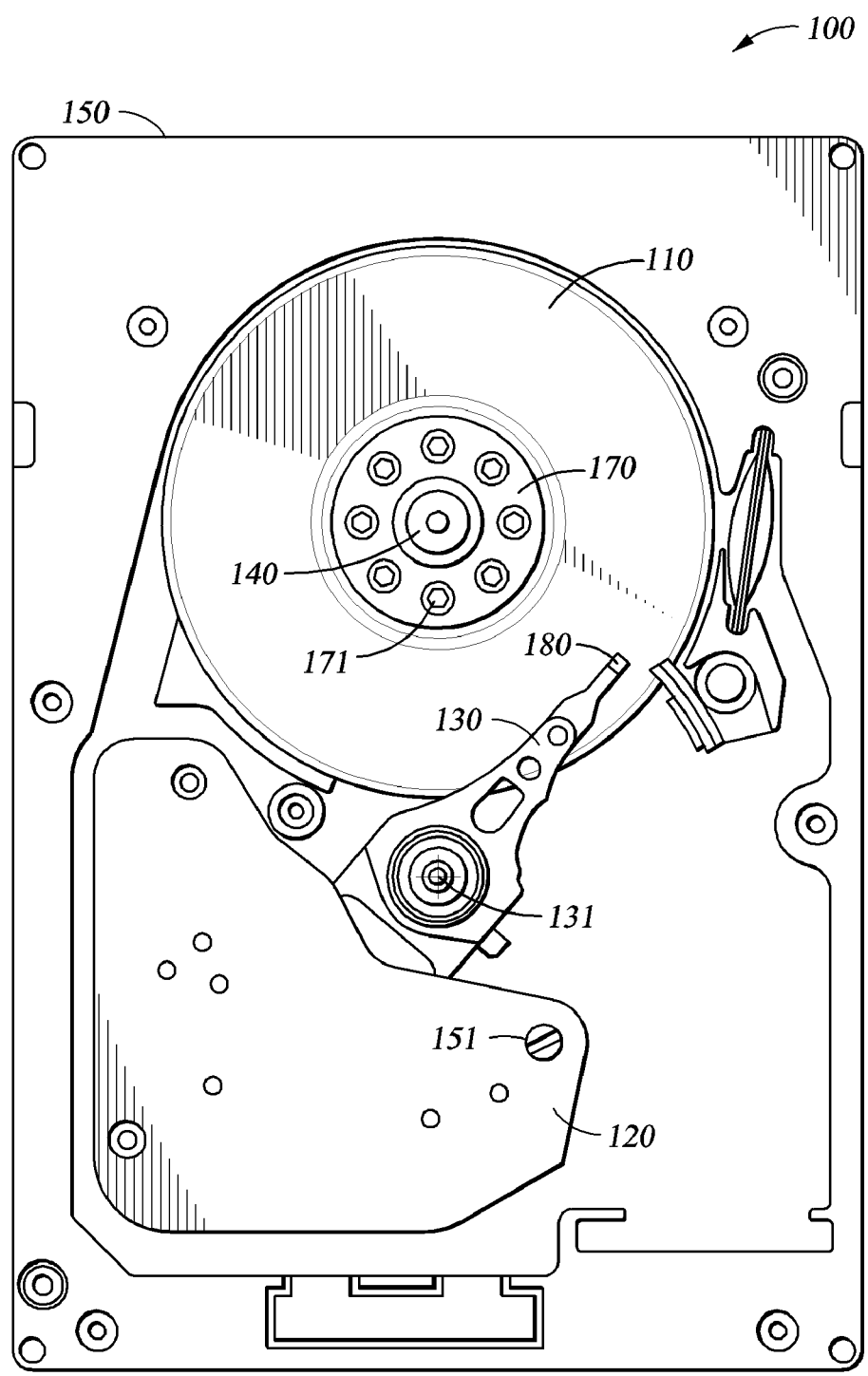
FIG. 1 is a an illustration of an exemplary hard disk drive according to one embodiment of the invention.

FIG. 1 illustrates an exemplary hard disk drive 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with spindle motor 140. Spindle motor 140 may be configured to rotate the magnetic disks at a predetermined rate. For example, spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

A top clamp 170 may be placed at the tip end of the spindle motor, as illustrated in FIG. 1. Top clamp 170 may be configured to secure the one or more magnetic disks in place so as to reduce undesired movement of the disks. A plurality of top clamp screws 171 may be employed to tightly couple the magnetic disks and spindle motor using the top clamp.

Magnetic disks 110 may contain circular tracks of data on both the top and bottom surfaces of the disk. An electromagnetic head, for example head 180 may be positioned on a track. As each disk spins, data may be written and read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

Figure 2:
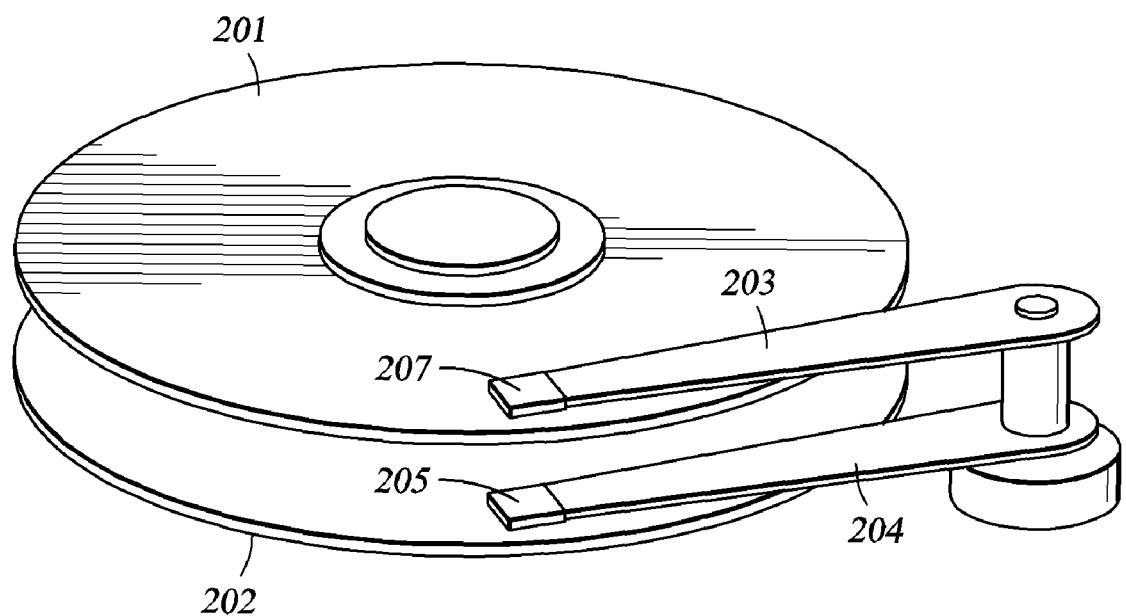
FIG. 2 is an illustration of vertical stacking of magnetic disk drives and associated electromagnetic heads, according to one embodiment of the invention.

As described above, a plurality of magnetic disks may be stacked vertically in HDD 100. Each disk may have read and write tracks on each side of the disk. Therefore, electromagnetic heads may be placed on both sides of the disk. FIG. 2 illustrates two magnetic disks 201 and 202 that are stacked vertically. Actuator arms 203 and 204 may access data tracks on disks 201 and 202. As illustrated, actuator arm 203 may be coupled with electromagnetic head 207 to access data tracks on the top face of disk 201.

Actuator arm 204 may contain head 205. Head 205 may be configured to access data tracks on the bottom face of disk 201 and on the top face of disk 202. While two magnetic disks are illustrated in FIG. 2, one skilled in the art will recognize that any number of magnetic disks may be vertically stacked with interleaving actuator arms providing heads to access the top and bottom faces of the disks.

Referring back to FIG. 1, each actuator arm 130 may be coupled to actuator 120. Actuator 120 may be a motor configured to control the swiveling movement of actuator arm 130 to place electromagnetic head 180 on a given data track. In one embodiment, the actuator arms may be connected. Therefore, all the actuator arms 130, and consequently all the electromagnetic heads 180 may move together.

A plurality of screws may be used to connect actuator arm 130 and actuator 120 to each other and to the HDD chassis 150. For example screw 151 (shown in FIG. 1) may connect actuator 120 to chassis 150. Each screw utilized to connect components of HDD may be coated in a lubricant to reduce friction during fastening of the screw. However, the use of lubricants, for example P104, has several disadvantages such as those detailed above. Embodiments of the invention provide solutions to improve performance of HDD screws by using perfluoropolyether (PFPE) based lubricants on HDD screws.

Advantages of PFPE Based Lubricants

PFPE's are a family of fluorinated synthetic fluids that are used to formulate lubricants that function for long periods of time in extreme environments. PFPE's are long chain fluoropolymers that are slippery and wet surfaces well, thereby making excellent lubricants. Moreover, PFPE's such as Ausimont Fomblin Z-DOL, Z-Tetraol, AM2001 and AM3001 are widely used for several disk drive applications such as magnetic disk lubrication. PFPE based lubricants provide several advantages over prior art lubricants such as P104, which is the currently used lubricant for HDD screws. The advantages of PFPE lubricants are outlined below.

Thermal Stability

PFPE lubricants do not change phase for a wide temperature range. Some PFPE lubricants may not change phase for temperatures ranging from around −90° C. to around 250° C. Therefore, PFPE lubricants maintain the same phase at both drive store and operating conditions. Experiments show that PFPE lubricants also have better thermal and chemical stability in comparison to current screw lubricants such as P104. For example, the decomposition temperature of PFPE based lubricants is approximately 50° C. higher than P104. Therefore, decomposition of PFPE lubricants occurs much slower, thereby increasing the shelf life.

Figure 3:
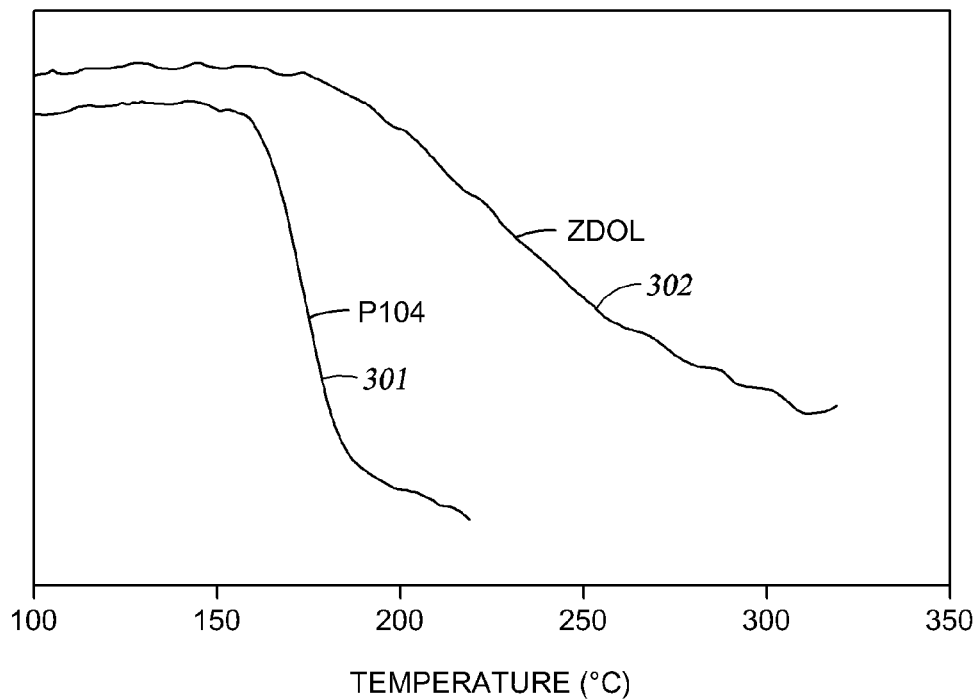
FIG. 3 is graph depicting results of an experiment comparing decomposition of P104 and Z-DOL 4000

FIG. 3 is a graph illustrating the results of an experiment demonstrating the superior stability of PFPE based lubricants in comparison to P104. During the experiment, two groups of screws from a common batch were coated with P104 and Z-DOL 4000 (a PFPE based lubricant available under the trademark NOVEC and manufactured by 3M company). The two groups of screws were then tested using Thermogravimetric analysis (TGA). TGA involves measuring the weight loss of a test sample while the sample is being heated at a uniform rate in a given environment.

FIG. 3 illustrates the results of an exemplary test using TGA, wherein the two groups of screws were sampled in air at a ramping rate of 20° C./min. The graph illustrated in FIG. 3 measures the weight loss in the screw coating for the lubricant along the y-axis, and the temperature along the x-axis. As illustrated in FIG. 3, the curve for P104 301 drops more rapidly and at lower temperatures in comparison to the curve for Z-DOL 4000 302. As depicted in the graph, Z-DOL 4000 decomposes at about 30-50° C. greater than P104.

One skilled in the art will recognize that the above experiment may be performed with other PFPE based lubricants. Different test environments and ramping rates may also be used to identify appropriate PFPE based lubricants for particular applications.

Particle Generation

Particle generation due to screw fastening is a significant concern because loose particles that deposit on magnetic disk surfaces can destroy the disk. In fact, to avoid particles such as dust from depositing on magnetic disks, HDD's are typically assembled in clean rooms and then sealed. However, particle generation during screw fastening cannot be avoided even inside a clean room. Because the magnetic disks spin at the rate of thousands of revolutions per minute, any particles that deposit on disk surfaces can not only lead to data loss but could also lead to physical destruction of the disk surface.

Particle generation is an even greater concern with screws fastened near magnetic disk surfaces. For example, due to the proximity of top clamp screws 171 to the magnetic disk surface, the probability of particles generated during the fastening of screws 171 depositing on the magnetic disk surfaces is especially high. While particle generation is reduced by coating screws with lubricants such as P104, experiments show that significant further reductions in particle generation can be achieved by using PFPE based lubricants.

Figure 4:
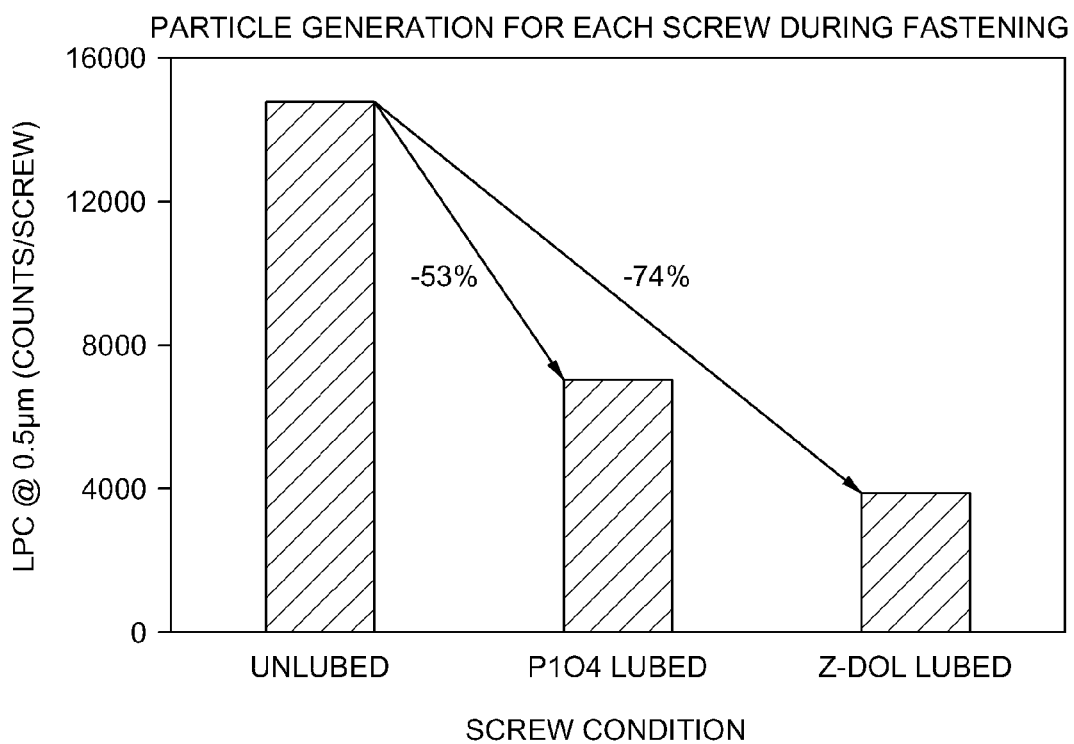
FIG. 4 is a bar graph depicting results of an experiment to compare particle generation by unlubricated screws, P104 coated screws and Z-DOL 4000 coated screws.

FIG. 4 illustrates a bar graph depicting results of an experiment to measure particle generation during fastening of unlubricated screws, P104 lubricated screws and PFPE lubricated screws. The PFPE based lubricant used for the experiment was Z-DOL 4000. The experiment was conducted by tightening six top clamp screws of each category to a spindle motor. Prior to insertion of the screws the motor surface was carefully washed away to remove any loose particles. The unlubricated screws, P104 lubricated screws and the Z-DOL lubricated screws were each fastened to a respective spindle motor using the same torque. Thereafter, the particles generated by each category of screws were measured by a spray laser particle counting (LPC) method commonly known to those skilled in the art.

The bar graph in FIG. 4 depicts the number of particles generated per screw for each category of screws. As illustrated in FIG. 4, the results of the above experiment show that the Z-DOL coated screws generated the least number of particles. As indicated by the bars in FIG. 4, while P104 lubricated screws generated 53% fewer particles than unlubricated screws, Z-DOL lubricated screws generated 74% fewer particles than the unlubricated screws.

The lower particle count for PFPE coated screws may be explained by the superior lubricity and thermal stability of PFPE lubricants as compared to P104. One skilled in the art will recognize that a significant amount of heat may be generated at certain locations during the screw fastening process. The heat generated may raise the temperature higher than the lubricant decomposition temperature. Therefore, because PFPE lubricants have better thermal stability, decomposition may be minimized, thereby providing better lubricity and lower particle generation.

Clamping Load Uniformity

Maintaining a uniform clamping load at locations using multiple screws may be a critical factor affecting the performance of hard disks. For example, referring back to FIG. 1, multiple top clamp screws 171 are used to clamp the one or more magnetic disks 110. A uniform clamping load may be critical to ensuring that the magnetic disks are correctly aligned with the electromagnetic heads 180. An uneven clamping load, for example, may cause the magnetic disks to tilt with respect to the electromagnetic heads. This may cause the electromagnetic heads to make improper contact with the magnetic disks, thereby adversely affecting performance of the HDD.

Experiments indicate that Z-DOL coated screws have a narrower clamping load distribution compared to P104 coated screws. In one experiment, a torque test machine was used to evaluate the clamping load for lubricated screws, P104 lubricated screws, and Z-DOL lubricated screws. A 0.5 Nm torque was applied to each of the screws during the experiment.

Figures 5, 6:
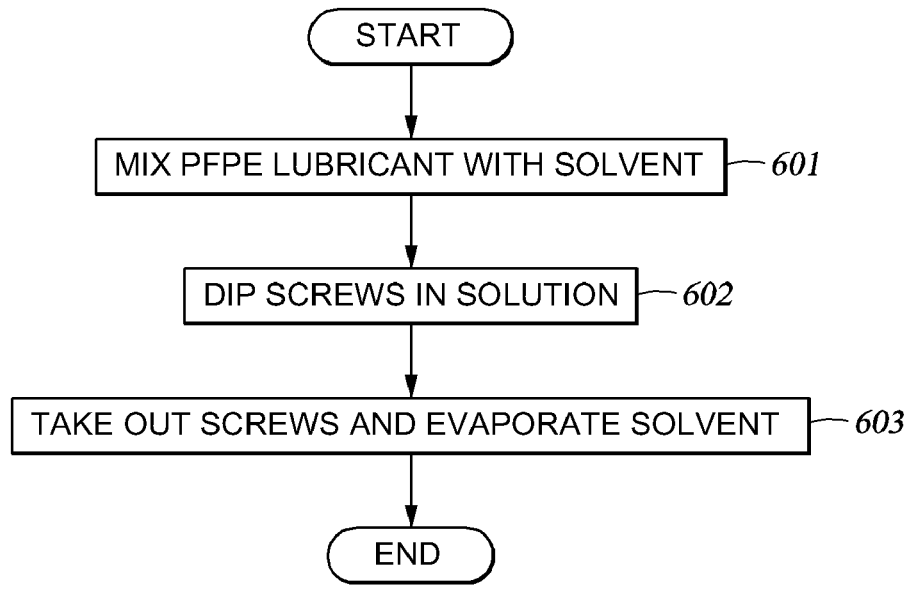
FIG. 5 is a table depicting results of an experiment to compare clamping loads of unlubricated screws, P104 coated screws and Z-DOL 4000 coated screws.
FIG. 6 is a flow diagram of exemplary operations performed to coat HDD screws in a layer of a perfluoropolyether (PFPE) based lubricant, according to one embodiment of the invention.

FIG. 5 depicts the results of the experiment. As illustrated by the standard deviation row 501, the load distribution of lubricated screws is superior to the load distribution of unlubricated screws. Furthermore, the standard deviation of Z-DOL coated screws is lower than the standard deviation of P104 lubricated screws which indicate that Z-DOL coated screws have narrower load distribution. The above experiment also indicates that the average clamp load of P104 coated screws may be better than Z-DOL coated screws. However, one skilled in the art will appreciate that in HDD applications narrower load distribution is more desirable than higher clamping loads.

Yet another advantage of using PFPE lubricated screws is that any cross contamination concerns may be eliminated or, at least reduced. PFPE lubricants are already widely used in HDDs. For example, magnetic disk drives are coated with PFPE lubricants to reduce friction between the head and the magnetic disk surface. Over time, the coating of PFPE lubricants on the magnetic disk surface may become depleted, thereby affecting drive performance. The PFPE coated screws may provide a reservoir of lubricants for the magnetic disk drive surface. For example, over time, the PFPE lubricant on the screws may evaporate and gradually deposit on the magnetic disk surface, thereby replenishing the depleted PFPE lubricants on the magnetic disk surface.

Screw Coating Process

FIG. 6 illustrates a flow diagram of exemplary operations performed to coat HDD screws with a layer of PFPE lubricant. The operations begin in step 601 by preparing a solution by mixing the PFPE lubricant with a solvent. Exemplary solvents include HFE7100 manufactured under the trademark FOMBLIN Z-DOL by Ausimont SpA, corporation. One skilled in the art will recognize that the amount of lubricant mixed in the solvent may depend on a number of factors, for example, the material used to make the screw, the thickness of the coating desired, etc. In one embodiment, the PFPE lubricant may be around 1% of the mixture.

In step 602, the screws may be dipped in the solution prepared in step 601. Thereafter, in step 603, the screws may be takes out of the solution, and the solvent may be allowed to evaporate, leaving a coating of the lubricant on the screw surface.

CONCLUSION

By coating HDD screws with a PFPE based lubricant, embodiments of the present invention achieve reduced friction during screw installation, narrower clamping loads between screws and lower particle generation during screw fastening. Furthermore, the lubricant on the HDD screw may provide a reservoir for replenishing depleting lubricants on the magnetic disk surface.

While the foregoing is directed to embodiments of the present invention, other and further embodiments of the invention may be devised without departing from the basic scope thereof, and the scope thereof is determined by the claims that follow.

The invention claimed is:

1. A method for coating a screw of a hard disk drive with a lubricant, comprising:
   mixing a predetermined amount of perfluoropolyether (PFPE) lubricant with a solvent to form a mixture;
   dipping the screw in the mixture; and
   removing the screw from the mixture and evaporating at least some of the solvent, wherein the PFPE lubricant is also used to coat a magnetic disk of the hard disk drive.

2. The method of claim 1, wherein the predetermined amount of lubricant is 1%.

3. The method of claim 1, wherein the PFPE lubricant is Z-DOL 4000 [trade].

4. The method of claim 1, further comprising: fastening components of a hard disk drive with the screw.

5. The method of claim 4, wherein the PFPE lubricant does not change phase at a store temperature and operating temperature of the hard disk drive.

6. The method of claim 1, wherein the PFPE lubricant maintains the same phase between −90° C. and 250° C.

7. The method of claim 3, wherein the solvent is HFE7100.

8. A hard disk drive comprising:
   components comprising one or more magnetic disks, a first motor configured to spin the one or more magnetic disks, an actuator arm associated with each magnetic disk, each actuator arm comprising at least one electromagnetic head, wherein the head is configured to perform read and write operations along a concentric data track of the magnetic disk, and a second motor configured to move the actuator arm to place the electromagnetic head on the data track; and
   screws that fasten one or more of the components to each other or to a chassis of the hard disk drive, wherein the screws are coated with a PFPE lubricant, and wherein the one or more magnetic disks are coated with the PFPE lubricant to reduce friction between the at least one electromagnetic head and the one or more magnetic disks.

9. The hard disk drive of claim 8, wherein the PFPE lubricant is Z-DOL 4000 [trade].

10. The hard disk drive of claim 8, wherein the PFPE lubricant does not change phase at the store temperature and operating temperature of the hard disk drive.

11. The hard disk drive of claim 8, wherein the PFPE lubricant maintains the same phase between a temperature of −90° C. to 250° C.

12. The hard disk drive of claim 8, wherein the screws fasten the one or more magnetic disks to the first motor using a clamp.

13. A screw comprising a coating of PFPE lubricant, wherein the coating of the PFPE lubricant is configured to:
   reduce friction during fastening of the screw;
   reduce particle generation during fastening of the screw;
   improve consistency in the clamp load between the screw and a second screw, wherein the second screw is similar to the first screw; and
   provide a reservoir to replenish a coating of the PFPE lubricant on a magnetic disk of a hard disk drive.

14. The screw of claim 13, wherein the PFPE lubricant is Z-DOL 4000 [trade].

15. The screw of claim 13, wherein the screw is used to fasten components of a hard disk drive.

16. The screw of claim 15, wherein the PFPE lubricant does not change phase at the store temperature and operating temperature of the hard disk drive.

17. The screw of claim 13, wherein the PFPE lubricant maintains the same phase between −90° C. to 250° C.

\* \* \* \* \*